United States Patent [19]

Young

[11] 3,875,081

[45] Apr. 1, 1975

[54] HYDROCARBON CONVERSION CATALYST

[75] Inventor: Dean Arthur Young, Yorba Linda, Calif.

[73] Assignee: Union Oil Company, Los Angeles, Calif.

[22] Filed: Aug. 16, 1972

[21] Appl. No.: 281,116

Related U.S. Application Data

[63] Continuation-in-part of Ser. No. 869,389, Oct. 24, 1969, abandoned, which is a continuation-in-part of Ser. No. 669,288, Sept. 29, 1967, abandoned.

[52] U.S. Cl............................................. 252/455 Z
[51] Int. Cl............................................. B01j 11/40
[58] Field of Search................. 252/437, 455 Z, 458

[56] References Cited
UNITED STATES PATENTS

| | | | |
|---|---|---|---|
| 3,210,265 | 10/1965 | Garwood | 252/455 Z |
| 3,304,254 | 2/1957 | Eastwood et al. | 252/455 Z |
| 3,392,108 | 7/1968 | Mason et al. | 252/455 Z |
| 3,397,137 | 8/1968 | Pickert et al. | 252/455 Z |

*Primary Examiner*—C. Dees
*Attorney, Agent, or Firm*—Lannas S. Henderson; Richard C. Hartman; Michael H. Laird

[57] ABSTRACT

Unique hydrocarbon conversion catalysts having substantially increased hydrogenation, hydrocracking and hydrofining activity are prepared by adding a Group VIB metal component, particularly molybdenum and/or tungsten metals, oxides or sulfides to an aluminosilicate in finely dispersed undissolved solid form and calcining the resultant combination. The invention also relates to the use of these compositions in hydrocarbon conversion systems.

5 Claims, No Drawings

3,875,081

HYDROCARBON CONVERSION CATALYST

This application is a continuation-in-part of my copending application Ser. No. 869,389 filed October 24, 1969, now abandoned, which was a continuation-in-part of then copending application Serial No. 669,288 filed September 29, 1967, now abandoned.

This invention relates to improved hydrocracking catalysts and their preparation and to hydrocracking processes employing the catalysts. Metals of Group VIB, in elemental form or in the form of their oxides or sulfides, have previously been employed as hydrogenation components on bases such as alumina and silicaalumina for hydrocracking operations. More recently, crystalline zeolites have been employed as the base material for catalysts in such reactions. While these catalysts have proved fairly satisfactory, improved performance, particularly with respect to ability to give a high yield of useful product, is much to be desired.

Prior art zeolite catalysts, such as those disclosed in U.S. Pat. No. 3,013,988, comprise a crystalline aluminosilicate zeolite containing a Group VIB metal, or oxide thereof, dispersed in the internal adsorption area of the zeolite. Such a dispersion was believed essential in order to provide the catalytic material in a form having a high specific surface suitable for catalysis. Dispersion of the catalytic material in the inner adsorption area of the zeolite was achieved by various processes such as (1) impregnation with an aqueous solution of a metal salt, followed by drying and thermal decomposition of the metal compound, (2) cation exchange using an aqueous solution of metal salt wherein the metal forms the cation, (3) cation exchange using an aqueous solution of metal compound in which the metal is in the form of a complex with complexing agents such as ammonia, followed by thermal decomposition of the complex and (4) vapor deposition of the metal or compound of the metal in the zeolite.

The prior art is replete with disclosures presented by previous investigators emphasizing the necessity of efficiently dispersing any and all active metals in the interior of any aluminosilicate in order to produce a highly active hydrocarbon conversion catalyst. Teachings of this nature are characterized by the discussion of J. A. Rabo et al. in U.S. Pat. No. 3,236,761 with regard to systems involving many different hydrogenation metals on varieties of crystalline aluminosilicates. In consideeration of those parameters considered determinative of catalytic activity, the prior art, e.g., Rabo et al., instruct the skilled artisan that the active components, i.e., metals or metal compounds, should be "highly dispersed" and that superior activity is achieved by "deposition of the active metal throughout the inner adsorption area of the molecular sieve". As pointed out by Rabo et al., these objectives are accomplished by employing catalyst preparation methods involving solubilized forms of the active constituents such as impregnation and ion exchange.

In view of the repeated disclosures of this nature it was rather surprising to observe that those teachings and conclusions do not apply to systems involving Group VIB metal compounds, particularly those involving molybdenum and tungsten and crystalline aluminosilicates. Quite the contrary, I have observed that the hydrogenation and hydrocracking activity of combinations of Group VIB metal components and zeolitic aluminosilicates prepared by methods promoting the highly efficient dispersion of the active metal components in the interior of the aluminosilicates are markedly inferior to compositions prepared by procedures leading to just the opposite result and which the practitioner in this art has been repeatedly admonished to avoid.

It has now been found that not only is dispersion on the inner adsorption area of the zeolite not essential, but that the hydrocracking and hydrogenation activity of the catalyst is greater when the hydrogenation component is combined with the zeolite in a manner that avoids impregnation into the zeolite inner adsorption area. Although the reason for the observed higher activity is not known with certainty, it is believed that the effect may be due to greater concentration of the hydrogenation component on the surface of the zeolite and, hence, its greater availability for catalyzing certain hydrocarbon conversion mechanisms such as hydrocracking and hydrogenation.

According to the invention, the desired dispersion of the hydrogenation component is achieved by adding it to the zeolite in an essentially undissolved form. The undissolved Group VI metal or compound, may be added by any of a variety of procedures of which the following are exemplary.

1. An insoluble compound of the Group VI metal may be mixed with the zeolite in the presence of water. Examples of suitable compounds are molybdic oxide, tungsten oxide, tungstic acid, ammonium ceric dodecamolybdate, etc. The mixing may consist of stirring, mulling, grinding, or any conventional procedure for obtaining an intimate mixture of solid materials. Mulling or grinding may be carried out in any conventional apparatus such as a pan muller, ball mill, pug mill or cone mixer for a period of time sufficient to intimately mix the Group VI metal compound and the zeolite and to reduce the particle size of the two if desired. Mulling or grinding for a period of about 10 to 30 minutes is usually sufficient to assure reduction of the additive particle size to a point which enables resolution of a fine dispersion after calcination. Particle sizes of these components prior to mulling are preferably less than 200 microns, usually less than about 5 microns. The optimum amount of water may vary widely, depending on the type of mixing, the type and particle size of the Group VI metal compound and the zeolite, etc. Although several of these compositions, i.e., molybdic acid and tungstic acid, are slightly soluble in water, particularly at elevated pH levels, only minor amounts, i.e., less than 10%, are solubilized and deposited inside the aluminosilicate unless inordinate amounts of water are employed and mulling or mixing in the presence of excess water is continued for an extended period. Even under these circumstances less than about 10% and usually less than about 5 weight percent of the active metal components will be distributed throughout the interior of the zeolite leaving some 90 to 95% of the active material deposited on the exterior surfaces of the aluminosilicate. Nevertheless, several precautions can be taken to avoid deposition of the active metals within the zeolite. One of these is the maintenance of a relatively low pH, preferably within the range of 3 to about 5 during the mixing in the presence of water so as to assure the insolubility of the otherwise slightly soluble additives. Yet another alternative involves filling the pores of the aluminosilicate with water or other similar solution prior to contacting with the active constituent so as to limit mass transfer by convection between the exterior and interior of the aluminosilicate. As a result, the amount of Group VI component combined with the zeolite usually corresponds to at least about 10 weight percent of the metal oxide based on zeolite while less than about 3 and preferably less than 1 weight percent of the oxide based on zeolite is associated with the zeolite inner adsorption area. Thus the predominance, and preferably all of the Group VI component combined with the zeolite is located on the exterior surface.

Following the mixing, the mixture is dried at a temperature of about 80° to 250°F. for a period sufficient to reduce the water content to about 10 to 25%. The resulting dried cake is then preferably granulated through a screen of about 12 to 30 mesh, mixed with a binder such as silica or alumina and combined with any other desired catalyst ingredients. The resulting mixture is then preferably pelleted, dried and calcined, according to conventional procedures.

2. A soluble compound may be mulled or ground with the zeolite, provided the mixture is dry or contains insufficient water to dissolve an appreciable amount of the soluble compound. Examples of suitable soluble compounds are ammonium heptamolybdate, ammonium paratungstate, ammonium sulfotungstate, ammonium phosphomolybdate, etc. However, as in the previous case involving addition of insoluble compounds, care should be taken to assure the formation of a finely dispersed form of the calcined active metal component. All of the soluble compounds considered in this embodiment are thermally decomposable and become more dispersed upon calcination due to fragmentation and the accommodation of a different chemical form. Nevertheless, care should be taken to assure a relatively even fine particle size distribution of the starting materials, i.e., the ammonium heptamolybdate, paratungstates, etc., during the mulling or mixing step. This objective can be easily accomplished by employing finely divided starting materials usually having particle sizes below about 300 microns, preferably less than about 200 microns. The particle size of these materials is further reduced upon mulling and, as previously mentioned, finer dispersion results from calcination and thermal decomposition. Promoters or stabilizers such as nickel nitrate crystals or cobalt carbonate may be added to the mixture prior to mulling or grinding. Following the mulling step the mixture is treated with a binder, other catalyst ingredients, pelleted, dried and calcined as above.

3. Insoluble or undissolved Group VIB compounds can be formed in the presence of the zeolite. For example, the zeolite can be slurried in a solution of ammonium molybdate or tungstate. Then the slurry is acidified to precipitate molybdic or tungstic acid. Insoluble heteropoly compounds can also be formed in a slurry of the zeolite, e.g., by adding phosphomolybdic acid to ammonium zeolite precipitates ammonium phosphomolybdate. Suitable insoluble combinations can also be prepared by slurrying the zeolite in an ammonium tungstate or molybdate solution and then adding a precipitating solution which contains, e.g., a dissolved Group IV metal (titanium, zirconium or thorium) compound. Solutions of the Group VIB component and the precipitating agent may also be added concurrently to a zeolite slurry with the initial acidities and proportions adjusted to obtain a pH sufficient to promote precipitation without destroying the zeolite. In addition, the Group VI metal compound, preferably in the form of a hydrous oxide, may be added to the zeolite prior to the addition of the Group VIB component. In any event, the hydrous oxides, e.g., the oxides of titanium, zirconium, thorium, iron or chromium, should have high isoelectric points and are preferably catalytically active alone or in combination with the zeolite or other active constituents. It is also presently preferred that the pH of the media in which the Group VI metal component is added to the hydrous oxide-aluminosilicate system be below the isoelectric point of the hydrous oxide, preferably within the pH range of about 3 to about 5.

The exact mechanism or mechanisms involved in utilizing such a Group IV metal compound for adding the Group VIB hydrogenation component is not known. However, it is believed that the relevant mechanisms may involve either formation of an insoluble compound with the hydrogenating component or adsorption of hydrogenating component as, for example, by means of ion exchange with a hydrous oxide of the Group IV metal. In any event, utilization of the Group IV metal results in efficient removal of the Group VIB hydrogenation component from the solution and its incorporation with the zeolite structure in such manner as to provide the described advantages.

These methods result in the nearly quantitative addition of the Group VIB component to the zeolite since there is no appreciable loss due to unadsorbed materials. Consequently, the recovery of impregnating solutions is not necessitated. These methods also permit post-exchange of stabilizing cations, such as cobalt or nickel, into the zeolite.

The mulling or grinding procedures, (1) and (2), can be followed by the addition of an alumina sol or basic aluminum salts along with sufficient water to form an extrudable past. Mixtures which contain about 20% alumina on a dry weight basis usually require about 50 to 60% water to form an extrudable mixture. An excellent binder can be prepared by adding nitric acid to a 30% slurry of boehimite. Adequate peptization occurs with 0.5 to 1.0 acid equivalents per mole of alumina. Acid sensitive zeolites can be protected by adding a suitable buffer such as nickel carbonate. However, the solzeolite mixture should be kept slightly acidic with pH less than 4.6 to avoid gelling the sol. A low pH is also necessary to maintain insoluble molybdic or tungstic acid. Insoluble heteropoly compounds and titanium or zirconium molybdates also decompose and dissolve in neutral mixtures. Solubilization lowers the activity and causes the catalyst to be similar to conventional impregnated preparations.

Dry mulling, as described in procedure (2), is usually done after the zeolite has been exchanged to the desired cationic form. The exchanged zeolite powder can also be calcined or steamed prior to combining with the molybdenum or tungsten. This improves the activity characteristics of the zeolite without adversely affecting the hydrogenation component.

A particularly active catalyst can be prepared by adding molybdenum or tungsten by the procedure herein described to an aluminosilicate containing a Group VIII metal stabilizing component, particularly nickel or cobalt, preferably added either by ion exchange or impregnation which has been calcined prior to addition of the Group VI metal component. Calcination of the aluminosilicate intermediate the addition of the Group VIII and Group VI components so modifies the characteristics of the combination that the resultant composition exhibits activity far superior to that exhibited by catalysts otherwise prepared. By this procedure the selected aluminosilicate is impregnated or ion exchanged with a soluble thermally decomposable salt of nickel or cobalt, e.g., carbonates, nitrates and the like, followed by calcination at a temperature of at least about 800°F., preferably about 1000° to 1600°F., depending on the thermal stability of the aluminosilicate. Further favorable modification of these compositions can be realized by rapidly bringing the aluminosilicate-Group VIII component combination to the prescribed calcination temperature. In this latter alternative it is generally desirable to bring the combination to the specified temperature within about 30 minutes, preferably within about 20 minutes.

The crystalline zeolites, commonly known as molecular sieves, are conventional and include the natural zeolite faujasite and synthetic zeolites X, Y and L. The latter three are described in U.S. Pat. Nos. 2,882,244, 3,130,007 and 3,216,789, respectively. These crystalline zeolites are metal aluminosilicates having a crystalline structure such that a relatively large absorption area is present inside each crystal. They consist basically of three-dimensional frameworks of $SiO_4$ and $AlO_4$ tetrahedra cross-linked by the sharing of oxygen atoms. The electrovalence of the tetrahedra containing aluminum is balanced by the inclusion in the crystal of cations, for example, metal ions, ammonium ions, amine complexes, or hydrogen ions. The spaces in the pores may be occupied by water or other adsorbate molecules.

The hydrogenation component is also conventional and comprises the Group VI metals, i.e., chromium, molybdenum, tungsten and uranium or any combination of these metals or their oxides or sulfides. Amounts of the hydrogenation component will usually range from about 0.1% to 20% by weight of the final composition, based on free metal. Generally, optimum proportions will range from about 0.5% to 10%.

Molybdenum in the form of the sulfide is especially preferred as the hydrogenation component, preferably in combination with nickel or cobalt oxide which serve to stabilize the crystalline structure of the zeolite at the temperature of the hydrocracking operation.

The stabilizing component, i.e., nickel or cobalt, is readily incorporated into the zeolite by exchange from an aqueous solution of a salt of the metal, followed by calcination to the oxide. It may also be incorporated before, after or simultaneously with addition of the hydrogenation component. Proportions of the nickel or cobalt will range from 2% to 15% by weight, with the preferred range being from 4% to 8%. Nevertheless, it is preferable to incorporate the stabilizing element by ion exchange or impregnation in that greater zeolite stability generally results from such procedure. The partial solubility of the Group VI component precursor in some embodiments also renders it advisable to incorporate the stabilizing component before adding the particulate molybdenum or tungsten compound with intermediate drying and/or calcination. This procedure limits loss and solubilizing of the hydrogenation component.

Following incorporation of the metal constituents into the zeolite the composite is pelleted or otherwise treated to obtain catalyst particles of the size and shape desired for the reaction to be catalyzed. For hydrocracking processes, pellets of the type described in the examples below are generally suitable. A binder or matrix material is desirably incorporated in, or admixed with, the metal-zeolite composite prior to pelleting in order to increase the resistance of the final catalyst particles to crushing and abrasion. Silica, introduced in the form of a sol, is very satisfactory for this purpose; however, other oxides such as alumina or mixed oxides such as silica-alumina, silica-magnesia, etc., may also be used. These materials are also conventional and are described in British Patent 1,056,301. A particularly preferred material in Ludox silica sol, described in U.S. Pat. Nos. 2,574,902 and 2,597,872.

The catalyst pellets are then dried and activated by calcining in an atmosphere that does not adversely affect the catalyst, such as air, nitrogen, hydrogen, helium, etc. Generally, the dried material is heated in a stream of dry air at a temperature of from about 500°F. to 1500°F., preferably about 900°F., for a period of about 1 to 16 hours, preferably about 8 hours, thereby converting the metal constituents to oxides.

In addition, the catalysts are preferably further activated by presulfiding with a sulfide such as hydrogen sulfide to convert the metal constituents of the catalyst to sulfides. This is readily accomplished, e.g., by saturating the catalyst pellets with hydrogen sulfide for a period of from about 1 to 4 hours. This procedure is described in more detail in U.S. Pat. No. 3,239,451.

The hydrocracking feedstock which may be treated using the catalysts of the invention include in general any mineral oil fraction boiling above the conventional gasoline range, i.e., above about 300°F. and usually above about 400°F., and having an end-boiling-point of up to about 1000°F. This includes straight-run gas oils and heavy naphthas, coker distillate gas oils, deasphalted crude oils, cycle oil derived from catalytic or thermal cracking operations, etc. These fractions may be derived from petroleum crude oils, shale oils, tar sand oils, coal hydrogenation products, etc. Feedstocks boiling above 480°F., preferably between about 400° and 650°F., having an API gravity of 20° to 35°, and containing at least about 30% by volume of acid-soluble components (aromatics + olefins) are generally employed. All of these feeds are known to contain substantial amounts of aromatic compounds which are hydrogenated and hydrocracked only with considerable difficulty. As demonstrated by the examples hereinafter detailed the catalysts of this invention are dramatically more effective in hydrogenating and hydrocracking heavier aromatic compounds such as naphthalenes, indanes, tetralins and the like. These catalysts are therefore particularly effective for converting feeds containing 10 vol. %, generally in excess of 30 vol. % aromatics to gasoline and midbarrel fuels.

Conversion conditions effective for promoting hydrogenation or hydrocracking generally comprise temperatures of 600° to about 900°F. and hydrogen partial pressures of at least about 100 psi.

The process of this invention may be carried out in any equipment suitable for catalytic operations. It may be operated batchwise or continuously. Accordingly, the process is adapted to operations using a fixed bed of catalyst. Also, the process can be operated using a moving bed of catalyst wherein the hydrocarbon flow may be concurrent or countercurrent to the catalyst flow. A fluid type of operation may also be employed. After hydrocracking, the resulting products may be separated from the remaining components by conventional means such as adsorption or distillation. Also, the catalyst after use over an extended period of time may be regenerated in accordance with conventional procedures by burning off carbonaceous deposits from the surface of the catalyst in an oxygen-containing atmosphere under conditions of elevated temperature.

While the foregoing description has centered mainly on hydrocracking processes, the catalysts described are also useful in a great variety of other chemical conversions, and generally, in any catalytic process requiring a hydrogenating or acid function in the catalyst. Examples of other reactions contemplated are hydrogenation, alkylation (of isoparaffins with olefins, or of aromatics with olefins, alcohols or alkyl halides), isomerization, polymerization, reforming (hydroforming), desulfurization, denitrogenation, carbonylation, hydrodealkylation, hydration of olefins, transalkylation, etc.

The following examples will serve to more particularly illustrate the preparation of the catalysts of the invention and their advantageous properties in hydrocracking operations.

Examples 1–4 and Table 1 show a comparison of four catalysts with similar compositions. The conventional preparation of Example 1, prepared by impregnation, had the lowest hydrogenation and hydrocracking activity. The three catalysts of Examples 2, 3 and 4, prepared by combining insoluble forms of molybdenum with cobalt zeolite Y, all gave similar higher hydrocracking and hydrogenation conversions, as shown in Table 1.

All four catalysts were made from the same batch of cobalt zeolite Y. The cobalt zeolite was prepared by slurrying 560 g ammonium zeolite Y in 500 ml water, adding 500 ml 1.5M $CoCl_2$, and heating to boiling for 1 hour. Then the slurry was filtered, washed and the exchange repeated. After the second exchange the zeolite was washed free of chloride and dried overnight at 220°F. Four 120 g portions of the cobalt zeolite were treated according to Examples 1–4.

EXAMPLE 1

The zeolite poweder was mixed with 126 ml Ludox LS 30% silica sol. Then 36 ml 1.7M $Co(NO_3)_2$ was added as a coagulant. The paste was cast into 0.094 × 0.020-inch pellets, dried at 220°F. and calcined 2 hours at 600°F. The calcined pellets were immersed for one hour in 155 ml of 1.04M $(NH_4)_2MoO_4$. Then the pellets were drained, dried at 220°F. and recalcined 2 hours at 600°F. Next the pellets were spread in a thin layer and the remaining drained molybdate solution was poured evenly over the pellets. The remainder of the solution was completely adsorbed. Then the pellets were redried and finally calcined at 900°F.

EXAMPLE 2

The cobalt zeolite Y powder, 120 g, was mixed with 23.3 g molybdic oxide for 30 minutes in a 12-inch pan muller. Then the mixture was added to 126 ml Ludox LS and 36 ml 1.7M $Co(NO_3)_2$ and formed into pellets as in Example 1. The pellets were dried and then calcined at 900°F.

EXAMPLE 3

The cobalt zeolite Y powder, 120 g, was mixed with 80 ml water and 23.3 g molybdic oxide powder. The mixture was stirred for 20 minutes and then dried overnight at 220°F. The dried cake was granulated through a 60 mesh screen before mixing with 126 ml Ludox LS and 36 ml 1.7M $Co(NO_3)_2$. The resulting paste was formed into pellets, dried and calcined as in Examples 1 and 2.

EXAMPLE 4

Ammonium phosphomolybdate was prepared as follows. A molybdate solution was prepared by dissolving 85.2 g $(NH_4)_6Mo_7O_{24} \cdot 4H_2O$ in 390 ml water. Then 85 ml 15N $HNO_3$ was added. A phosphate solution was prepared by dissolving 21.2 g $(NH_4)_2HPO_4$ in 85 ml water and 42 ml 15N $HNO_3$. The phosphate solution was slowly added to the molybdate solution. Then the mixture was allowed to stand 20 minutes, chilled and decanted. The pH was adjusted to 2.0 with 3N $NH_4OH$. Then the slurry was filtered, washed with ice water, and pressed out to a firm cake. The ammonium phosphomolybdate contained 31.3% volatile material when a sample was calcined at 1000°F.

Cobalt zeolite Y, 120 g, was mixed with 76 ml water and 35.5 g of the ammonium phosphomolybdate filter cake. The mixture was stirred for 20 minutes and then dried overnight at 220°F. The dried cake was granulated through a 60 mesh screen before mixing with 126 ml Ludox LS and 36 ml 1.7M $Co(NO_3)_2$. The resulting paste was formed into pellets, dried, and calcined as previously.

The feed used in the tests was a synthetic gas oil 50-50 blend of tetralin and klearol by volume boiling between 400° and 812°F., having an API gravity of 24.6° and containing 1.0 weight percent sulfur. As klearol is a paraffinic stock, only 50 volume percent of the feed molecules contained aromatic nuclei and these molecules, i.e., tetralin, were not completely aromatic. These factors tend to complicate determination of aromatic conversion by product analysis. The test conditions were: 650°F., 1000 psig, 2.0 LHSV and 6000 CF $H_2$/B.

Table 1

|  | Example 1 | Example 2 | Example 3 | Example 4 |
| --- | --- | --- | --- | --- |
| Composition |  |  |  |  |
| % $MoO_3$ | 14.7[a] | 12.7[b] | 12.8[b] | 12.7[c] |
| % CoO | 5.8 | 5.3 | 5.9 | 5.9 |
| % $SiO_2$ | 27 | 27 | 27 | 27 |
| Activity Data |  |  |  |  |
| Hours on Stream | 3–19 | 2–18 | 3–19 | 3–19 |
| °API | 32.4 | 35.8 | 27.5 | 35.9 |
| 400°F. Conversion vol % of Feed | 40 | 53 | 52 | 51 |
| Gasoline Composition: |  |  |  |  |
| Aromatics, vol % | 42 | 36 | 34 | 36 |
| Olefins, vol % | 0 | 0 | 0 | 0 |
| Saturates, vol % | 58 | 64 | 66 | 64 |

[a] Impregnation with ammonium molybdate solution.
[b] Mulled with insoluble molybdic oxide.
[c] Mulled with insoluble ammonium phosphomolybdate.

Examples 5–8 and Table 2 further demonstrate the adverse effect of molybdenum solvation on hydrocracking activity. The catalyst of Example 5, made by impregnating nickel zeolite Y with a solution of ammonium heptamolybdate, was inferior to that of Example 6, made by acidifying a molybdate solution and mixing with the zeolite. Example 8 shows the adverse effect of decomposing and dissolving ammonium phosphomolybdate in the presence of nickel zeolite Y. Higher hydrocracking conversions and improved denitrogenation occurred when the molybdenum solubility was decreased through the use of ammonium phosphomolybdate (Example 7) or the formation of molybdic acid (Example 6).

The catalysts of Examples 5–8 were all made from one batch of nickel zeolite Y. The preliminary nickel exchange consisted of mixing 550 g ammonium zeolite Y (1.6% $Na_2O$) with one liter of 1.0M nickel chloride, heating to 200°F., allowing to cool, filtering and washing free of chloride. This exchange was repeated twice. After the final wash the product was dried overnight at 200°F. The loss on ignition was 17.6% and the nickel content was 8.5% NiO on a calcined basis. One hundred gram portions of this material were used to prepare the four catalysts of the examples. The following quantities of components were added to the catalysts:

ammonium heptamolybdate, 26.0 g, containing 82% $MoO_3$.

Ludox LS silica sol, 112 ml, containing 0.36 g $SiO_2$/ml.

Nickel oxide, 4.1 g, was added as 1.7M nickel nitrate (0.127 g NiO/ml) or as 1.7M nickel nitrate and nickel carbonate powder. When nickel carbonate was added, the nickel nitrate was decreased to keep the same total number of equivalents.

A small quantity of phosphorus, approximately 0.8 g $P_2O_5$, was added as part of the phosphomolybdate complex to catalysts prepared by the method of Examples 7 and 8.

EXAMPLE 5

The nickel zeolite Y powder was mixed with the Ludox LS and 32 ml 1.7M nickel nitrate. The paste was cast into pellets, dried, and calcined at 600°F. for 1 hour. The calcined pellets were immersed overnight in a solution of the ammonium heptamolybdate in 150 ml water, drained, dried and recalcined at 600°F. A small amount of nickel molybdate precipitated during the impregnation due to nickel-ammonium exchange. After the second calcination the pellets were spread in a thin layer and allowed to absorb the remainder of the impregnation solution. Next, the catalyst was activated by calcining overnight at 900°F. in dry flowing air and then saturated with hydrogen sulfide at room temperature.

EXAMPLE 6

The ammonium heptamolybdate was dissolved in 100 ml water. Sufficient 3N nitric acid was added to lower the pH to 4.0 and precipitate the molybdate prior to contact with the aluminosilicate. The nickel zeolite Y powder was slurried with this solution, allowed to stand overnight, and then dried on a steam bath. The dried powder was mixed with the Ludox LS and 32 ml 1.7M nickel nitrate. The paste was formed into pellets and activated according to the procedure of Example 5.

EXAMPLE 7

The ammonium heptamolybdate was dissolved in 130 ml water. Then 25 ml concentrated nitric acid was added. A phosphate solution was prepared by dissolving 6.5 g diammonium phosphate in 25 ml water and 13 ml concenntrated nitric acid. The phosphate solution was slowly added to the molybdate solution and then allowed to stand 20 minutes. The ammonium phosphomolybdate precipitate was collected by centrifuging and washed with 50 ml water. The washed precipitate was reslurried in 80 ml water. Powdered nickel carbonate, 2.9 g, was added as a buffer which would not decompose the phosphomolybdate complex while protecting the zeolite from strong acidity. The nickel zeolite Y powder was added to the slurry. The pH of the combination was 4.9. Next, the slurry was dried on a steam bath and the dried powder was mixed with the Ludox LS and 18 ml 1.7M nickel nitrate. The paste was formed into pellets and activated according to the previous examples.

EXAMPLE 8

The same procedure and quantities used in Example 7 were repeated, except for the pH adjustment. The pH of the slurry was increased from 4.9 to 6.7 by the addition of a small amount of ammonium hydroxide prior to evaporating on the steam bath.

The hydrocracking activity comparisons shown in Table 2 were determined using a gas oil feed with the following characteristics:

| | |
|---|---|
| Gravity | 24.9° API |
| Boiling Range | 455–890°F. |
| Sulfur Content | 1.05 wt. % |
| Nitrogen Content | 0.233 wt. % |

The test conditions were 800°F., 1400 psig, 2.0 LHSV, and 12,000 CF $H_2$/B.

Table 2

| | Example 5 | Example 6 | Example 7 | Example 8 |
|---|---|---|---|---|
| Composition | | | | |
| % $MoO_3$ | 14.3[b] | 13.1[c] | 11.1[d] | 12.4[e] |
| % NiO | 6.6 | 6.5 | 6.3 | 6.8 |
| % SiO | 27 | 27 | 27 | 27 |
| pH[a] | 5.5 | 3.8–4.0 | 4.9 | 6.7 |
| Form of Added Mo. | Soluble | Insoluble | Insoluble | Soluble |
| Activity Data | | | | |
| Hours on Stream | 27–36 | 27–36 | 27–36 | 27–36 |
| 455°F. Conversion, vol % of Feed | 47.5 | 55.7 | 56.6 | 47.8 |
| 120–360° Gasoline, vol % of Feed | 30.0 | 40.8 | 36.8 | 31.6 |
| Residual Nitrogen, wt. % | 0.027 | 0.013 | 0.020 | 0.037 |

[a]During molybdenum addition.
[b]Added as soluble ammonium heptamolybdate.
[c]Added as insoluble acidified molybdate.
[d]Added as insoluble acidified phosphomolybdate.
[e]Added as soluble phosphomolybdate at high pH.

Examples 9 and 10 and Table 3 compare two parallel nickel molybdenum zeolite Y catalysts. This comparison again shows the favorable effect of acidifying the molybdate solution to form relatively insoluble molybdic acid. The feed and test conditions were the same as those used in testing the catalysts of Examples 5 to 8.

EXAMPLE 9

Ammonium heptamolybdate, 20.7 g, was dissolved in 100 ml water and the pH was adjusted to 7.0 with 15N $NH_4OH$. Ammonium zeolite Y powder, 100 g, was then added and the mixture stirred and evaporated to a pasty consistency on a steam bath. 27 ml of 1.7M nickel nitrate was added and the mixture was stirred and dried on a steam bath. The dried material was then granulated and mixed with 113 ml of Ludox LS and 32 ml 1.7M nickel nitrate. This mixture was then cast into 0.094 × 0.020-inch pellets, dried and calcined at 900°F.

EXAMPLE 10

The procedure employed was the same as that of Example 9 except that the pH was initially adjusted to 4.0 with 15N $HNO_3$, instead of to 7.0 with $NH_4OH$.

Table 3

| | Ex. 9 | Ex. 10 |
|---|---|---|
| Activity Data | | |
| pH of Preparation | 7.0 | 4/0 |
| Product Gravity, °API | 41.1 | 44.4 |
| 455°F. Conversion, vol % of Feed | 42.5 | 49.0 |
| 120-360°F. Gasoline, vol % of Feed | 28.0 | 31.3 |
| Residual Sulfur, wt.% | 0.091 | 0.040 |
| Residual Nitrogen, wt.% | 0.045 | 0.035 |

Although lowering the pH, as illustrated in the above examples, is an effective way of decreasing the solubility of molybdates, tungstates, etc., an even more quantitative removal from solution can be achieved by use of an adsorbing or precipitating agent in the catalyst preparation. Insoluble hydrous oxides of metals such as titanium, zirconium, thorium, iron and chromium have been found to be particularly effective for this purpose. The hydrous oxide, in addition to being insoluble, should have a high isoelectric point and should form a catalytically active combination with the hydrogenation component. Addition of the hydrogenation component should be effected at a pH that is below the isoelectric point of the hydrous oxide. This pH value will generally be in the range of about 3 to 5. Examples 11-14 and Table 4 illustrate preparation and activity of catalysts using titanium or zirconium for adsorption or precipitation of molybdates into zeolite catalysts.

EXAMPLE 11

The titania gel used in this example was prepared by adding 25 ml 4M $TiCl_4$ solution to 250 ml 2.4N ammonium hydroxide. The gel was collected by filtration, washed free of chloride, and then dried for 2 hours at 400°F. A 6.2 g portion of the dried gel was mulled with 100 g ammonium zeolite Y. The mulled powder mixture was slurried in 215 ml of 0.69M ammonium molybdate. The pH was adjusted to the interval 3.6-3.8 with nitric acid. After two days the solids were collected by filtration. The dissolved molybdenum was recovered by evaporating the filtrate and calcining the residue 2 hours at 700°F. The weight of the residue, 7.4 g, indicated that approximately 65% of the original molybdate had been adsorbed on the titania gel-zeolite mixture. Next, the recovered 7.4 g of molybdenum was added back to the catalyst by mulling with the zeolite mixture. Nickel was exchanged into this combination by slurrying with 62 ml 1.0M nickel nitrate, allowing to stand overnight, and filtering. The filter cake was dried, mixed with 115 ml Ludox LS 30% silica sol and 36 ml 1.7M nickel nitrate, cast into pellets, and calcined at 900°F.

EXAMPLE 12

The titania in this example was formed in situ by adding solutions of titanium chloride and ammonium hydroxide concurrently to the zeolite slurry. This procedure gives an improved molybdenum distribution and is easier to handle during washing. Removal of chlorine ions by washing improves the subsequent adsorption of molybdic acid. The pH must be lower than the isoelectric point of titania during the adsorption of molybdenum. The specific procedure was as follows.

To 100 g ammonium zeolite Y was added 370 ml of 0.2M $TiCl_4$ and 3N $NH_4OH$ to maintain the pH in the range of 3.5-3.9. The slurry was then filtered and the residue washed with water and slurried in 177 ml of 0.69M ammonium molybdate solution. The resulting mixture was aged two days at room temperature and filtered. The dissolved molybdenum was recovered by evaporating the filtrate and calcining the residue two hours at 700°F. The weight of residue, 2.3 g, indicated that approximately 87% of the original molybdate had been adsorbed on the titania-zeolite combination. Next, the recovered 2.3 g of molybdenum was added back to the catalyst by mulling with the zeolite combination. Nickel was exchanged into the catalyst by slurrying with 59 ml 1.0M nickel nitrate, allowing to stand overnight, and filtering. The filter cake was dried, mixed with 111 ml Ludox LS and 35 ml 1.7M nickel nitrate, cast into pellets, and calcined at 900° F.

EXAMPLE 13

The catalyst of this example was made by concurrently adding titanium and molybdenum solutions to the zeolite slurry. The proportions were adjusted during this addition to keep the pH less than 4.0 since a neutral or high pH would have caused the molybdenum to remain in solution. The specific procedure was as follows.

A 100 g portion of ammonium zeolite Y was slurried in 200 ml water. Ammonium molybdate, 177 ml 0.69M solution, and $TiCl_4$, 270 ml 0.2M solution, were added concurrently to this slurry. Sufficient 3N ammonium hydroxide was also added to maintain the pH in the range 3.5-3.9. The resulting combination was aged two days at room temperature and filtered. The dissolved molybdenum was recovered by evaporating the filtrate and calcining the residue 2 hours at 700°F. The weight of residue, 2.8 g, indicated that approximately 85% of the original molybdate had been adsorbed or precipitated on the titania-zeolite combination. Next, the recovered 2.8 g of molybdenum was added back to the catalyst by mulling with the zeolite combination. Nickel was exchanged into the catalyst by slurrying with 59 ml 1.0M nickel nitrate, allowing to stand overnight, and filtering. The filter cake was dried, mixed with 111 ml Ludox and 35 ml 1.7M nickel nitrate, cast into pellets, and calcined at 900°F.

EXAMPLE 14

The catalyst of this example was made by alternate addition of titanium, molybdenum and zirconium. The final extra addition of zirconyl chloride considerably lowered the molybdate concentration in the filtrate (only 6.7% of the molybdenum remained dissolved after the zirconium addition). The specific procedure was as follows.

A 438 g portion of ammonium zeolite Y was slurried in 530 ml water. TiCl$_4$, 980 ml 0.2M solution, was added to the slurry concurrently with sufficient 3N ammonium hydroxide to maintain the pH in the range 3.5–3.9. The solids were collected by filtration, washed free of chlorides, and then slurried in 470 ml 0.69M ammonium molybdate. Next, 150 ml 0.2M TiCl$_4$ and 200 ml 1.0M zirconyl chloride were added concurrently with sufficient 3N ammonium hydroxide to maintain 3.5–3.9 pH. Then the dissolved molybdenum was determined by filtering, evaporating the filtrate, and calcining the residue two hours at 700°F. The weight of the residue, 3.2 g indicated that approcimately 93% of the original molybdate had been adsorbed or precipitated on the titania-zirconia-zeolite combination. Next, the recovered 3.2 g of molybdenum was added back to the catalyst by mulling with the zeolite combination. Nickel was exchanged into the catalyst by slurrying with 160 ml 1.0M nickel nitrate, allowing to stand overnight, and filtering. The filter cake was dried, mixed with 295 ml Ludox LS and 93 ml 1.7M nickel nitrate, cast into pellets, and calcined at 900°F.

The data in Table 4 compare the hydrocracking and hydrogenation activities of the catalysts of Examples 11–14. The feed and test conditions used in testing these catalysts were the same as those used for testing the catalysts of Examples 1 to 4. The catalyst of Example 14, in which the molybdenum formed the least soluble combination with titanium and zirconium, was the most active. The catalyst of Example 13, made by concurrent additions, and that of Example 12, made by adsorption on the insitu titania, showed intermediate amounts of dissolved molybdenum. These two catalysts also had intermediate activities. The catalyst prepared with the separately prepared titania gel, that of Example 11, had the largest amount of dissolved molybdenum and the lowest activity. These results are consistent with the data in Tables 1, 2 and 3, i.e., combining or forming insoluble molybdenum with the zeolite gives greater activity. The catalyst of Example 1, prepared by impregnating with completely dissolved ammonium molybdate, was the least active catalyst tested. Mulling with insoluble forms of molybdenum gave appreciable improvement, as shown by the catalysts of Examples 2, 3 and 4. Forming insoluble molydates in the presence of the zeolite gave the highest activities, as shown by the catalysts of Examples 12, 13 and 14.

Table 4

|  | Example 11 | Example 12 | Example 13 | Example 14 |
|---|---|---|---|---|
| Composition |  |  |  |  |
| % MoO$_3$ | 12.7 | 11.0 | 10.4 | 9.3 |
| % NiO | 6.5 | 5.8 | 5.9 | 4.0 |
| % TiO$_2$ | 4.5 | 3.3 | 3.5 | 4.0 |
| % ZrO$_2$ |  |  |  | 5.6 |
| Activity Data |  |  |  |  |
| Hours on Stream | 3–19 | 2–18 | 2–18 | 2–18 |
| °API | 34.7 | 38.5 | 40.3 | 41.8 |
| 400°F. Conversion, vol% of Feed | 51 | 59 | 62 | 73 |
| Gasoline Composition |  |  |  |  |
| Aromatics, vol% | 42 | 31 | 28 | 25 |
| Olefins, vol% | 0 | 0 | 0 | 0 |
| Saturates, vol% | 58 | 69 | 72 | 75 |

As described above, soluble components can be used to prepare highly active zeolite catalysts provided there is insufficient water to dissolve the Group VIB component. The catalysts of the following Examples, 15 and 16, were made by mulling cobalt zeolite Y powder with crystals of nickel nitrate and ammonium heptamolybdate. Then, after the mixture was uniform, a 30% alumina sol was added in an amount to provide 20% Al$_2$O$_3$ binder on a dry basis. The pH of the extrusion pastes were 4.4 and 3.9 for Examples 15 and 16, respectively. This acidity, by forming molybdic acid, suppressed the tendency of molybdenum to dissolve. The catalyst of Example 16, made with 900°F. calcined cobalt zeolite Y, had the highest hydrocracking activity and produced fewer light hydrocarbons per amount of gasoline. Results are shown in Table 5. The feed and test conditions were the same as those used in testing the catalysts of Examples 1 to 4.

EXAMPLE 15

A 78 g portion of cobalt zeolite Y, which contained 16.3% adsorbed water, was mulled with 19.5 g Ni(NO$_3$).6H$_2$O and 18.3 g (NH$_4$)$_6$ Mo$_7$O$_{24}$. 4H$_2$O crystals in a pan muller for 30 minutes. Then 67 g of an acidic 30% alumina sol was added to provide 20% Al$_2$O$_3$ binder on a dry basis. Nitric acid in the alumina sol lowered the pH of the final mixture to 4.4. The paste mixture was extruded as 1/16-inch rods, dried, and activated by calcining at 900°F.

EXAMPLE 16

A portion of the cobalt zeolite Y used in Example 15 was calcined 16 hours at 900°F. Then 61 g of the calcined zeolite was mulled with 19.5 g Ni(NO$_3$)$_2$.6H$_2$O and 18.3 g (NH$_4$)$_6$ Mo$_7$O$_{24}$.4H$_2$O crystals in a pan muller for 30 minutes. Next, 67 g of an acidic 30% alumina sol was added to provide 20% Al$_2$O$_3$ binder on a dry basis. Nitric acid in the alumina sol lowered the pH of the final mixture to 3.9. The paste mixture was extruded as 1/16-inch rods, dried, and activated by calcining at 900°F.

Table 5

|  | Example 15 | Example 16 |
| --- | --- | --- |
| Activity Data |  |  |
| Hours on Stream | 2–18 | 2–18 |
| °API | 36.5 | 42.1 |
| 400° Conversion, vol% of Feed | 52 | 65 |
| Gasoline Composition |  |  |
| Aromatics, vol% | 35 | 25 |
| Olefins, vol% | 0 | 0 |
| Saturates, vol% | 65 | 75 |

The marked increases in API gravity resulting from the use of the inventive catalysts indicates that they exhibit considerably higher aromatic hydrogenation and hydrocracking activity in addition to high hydrocracking and hydrofining activity in general. However, as previously pointed out in reference to the examples, the nature of the feedstock employed in the preceding illustrative operations somewhat complicates the quantitative determination of actual aromatics hydrogenation or conversion by product analysis. This situation arises due to the fact that the aromatic feed molecules, i.e., tetralin, could be partially converted by cracking of the nonaromatic ring without destruction of the aromatic nuclei, making it appear on a volume percentage basis that some conversion of aromatics had been effected. In view of these considerations it is apparent that the degree of aromatics conversion realized in Example 15 and 16 and the difference in aromatics conversion between those two operations were much greater than might be concluded by a simple comparison of the volume percent aromatics remaining in the product. In order to clarify these catalyst characteristics another operation was performed with another feedstock under conditions sufficient to enable a fairly detailed analysis of aromatics hydrogenation and hydrocracking activity. These operations are reported in the following examples.

EXAMPLE 17

Care was taken during the preparation of the catalyst for this example to assure that substantially all of the hydrogenation components, i.e., molybdenum, retained on the zeolite, was well dispersed on the interior adsorption surfaces of the aluminosilicate. The zeolite base was prepared by multiple steaming and ion exchange of sodium Y zeolite. The original zeolite contained 49.7 weight percent volatile matter, 1.8 weight percent sodium determined as $Na_2O$, a cell constant of 24.687 A and a crystallinity of 107% determined by reference to a standard. This zeolite was first steamed at temperatures of 1150° to 1250°F. under a steam partial pressure of 15 psi for 1 hour. The steamed product was then slurried in a 20% solution of ammonium sulfate and retained in contact with the solution for 1 hour at 194°F. The exchanged product was then collected by filtration and water washed free of sulfate followed by a second steaming for 1 hour at 1300° to 1400°F. in an atmosphere of 15 psi steam. The resultant zeolite had a sodium content of 1.89 weight percent determined as $Na_2O$, a crystallinity of 81% compared to the aforementioned standard and a cell constant of 24.339 A determined by X-ray diffraction.

A portion of the steamed zeolite was then impregnated with ammonium molybdate by the following procedure. An ammonium molybdate solution was prepared by dissolving 110 g $(NH_4)_6Mo_7O_{24}$ in 320 milliliters of water and 162 milliliters of 15N $NH_4OH$ and diluting with water to a total volume of 600 milliliters. A 300 g portion of the steamed zeolite powder was then evacuated at less than 5 milliliters pressure for 1 hour after which the 600 milliliters of molybdate solution were released onto the evacuated powder. The vacuum was removed and the resulting paste was agitated for one hour and then collected by filtration. The resulting filter cake was dehydrated by drying at 230°F. for 2 hours, 350°F. for 2 hours and a terminal drying at 540°F. was effected to promote the formation of $(NH_4)_2Mo_4O_{13}$ in accordance with the teachings of C. Duval, Anal. Chim. Acta 15, 225 (1956). This procedure was followed in order to convert the molybdenum to a relatively insoluble form. The compound discussed by Duval is only moderately soluble (3.6 grams/100 milliliters water) according to Seidell and Linde, 4th Ed., page 705. The zeolite thus dried was water washed to remove any extraneous unimpregnated molybdenum from the outer surfaces of the aluminosilicate. This washing procedure consisted of slurrying the powder in 2 liters of ice water and stirring for 45 minutes. The washed product was then collected, dried and heated to 740°F. for 14 hours to form insouble $MoO_3$ in the zeolite pores. Analysis confirmed the presence of 13.4 weight percent $MoO_3$. This amount of molybdenum was not nearly sufficient to block the pores of the aluminosilicate or inhibit activity or mass transfer. The pore volume of the original steamed echanged zeolite was determined to be 0.35 cc per gram according to nitrogen adsorption measurements. In that the density of $MoO_3$ is 4.5 grams per cc, it is apparent that approximately 8.5 percent of the zeolite pore volume was occupied by the 13.4 weight percent $MoO_3$ present.

The impregnated dried zeolite was combined with a clay binder and water in the following proportions: 161 g zeolite, 153 g ammonium montmorillonite (12.2% volatiles) and 210 milliliters water. The paste was then extruded through a 1/32-inch die, dried and activated by heating from 500° to 870°F. in a rotary calciner. This catalyst was employed to hydrocrack a naphthalene reformer bottoms product having the characteristics listed in Table 6.

Table 6

| Gravity | 10.5°API |
| --- | --- |
| Sulfur | 15 ppm |
| Nitrogen | 2.5 ppm |
| $C_5$ Minus | 0.01 vol.% |

| Distillation[a] | |
| --- | --- |
| Temperature, °F | V91.% |
| 451 –461 | 9.9 |
| –642 | 10.0 |
| –464 | 9.7 |
| –465 | 9.8 |
| –467 | 10.2 |
| –472 | 12.5 |
| –486 | 8.3 |
| –503 | 10.5 |
| ·503 + | 17.6 |

[a]Spinning Band, 2/1 reflux

The predominant chemical constituents of the feed and product are summarized in Table 7.

EXAMPLE 18

The catalyst of this example was prepared by the methods of this invention designed to assure deposition of a predominant amount of the Group VIB metal hydrogenation component on the exterior of the aluminosilicate rather than on the interior adsorption surfaces. The zeolite base was prepared in accordance with the procedures described in Example 17. However, the catalyst was prepared by dry mulling the zeolite with $(NH_4)_2Mo_4O_{13}$. The final catalyst comprised 157 g of zeolite base, 17.9 g $(NH_4)_2Mo_4O_{13}$ (16.4 g $MoO_3$) and 164 g of ammonium montmorillonite (144 g dry weight). These components were combined by mulling, extrusion, drying and activation as described in Example 17.

The catalysts of Examples 17 and 18 were then employed to hydrocrack and feed described in Example 17 at 650°F., 1500 psig, 12,000 of $H_2$/bbl and 2 space velocities of 2.0 and 4.0 LHSV. Each catalyst was presulfided in situ by contacting with 10 vol.% hydrogen sulfide in hydrogen at atmospheric pressure during a 2 hour heating up period to 700°F. and for 30 minutes at 700°F. The results of these operations are summarized in Table 7.

hydrocarbons was substantially more than three times greater than that realized with the impregnated catalyst of Example 17. Conversion of the high naphthalene feedstock to mononaphthenes was approximately ten times as great at both space velocities while conversion to dinaphthenes was approximately twenty times as great in each instance. Even more important from the standpoint of fuel quality is the observation that production of benzenes and lower boiling substituted benzenes in Example 18 was 600 and 200% as great as that of the comparison run at the two space velocities.

Evaluation of the bottoms product containing hydrocarbons boiling above the initial boiling point of the feed provides further insight into the properties of these two catalysts. The catalyst in Example 17 had no effect on the proportion of alkyl benzenes in the feed while the catalyst of Example 18 increased the proportion of these constituents by approximately 1.5 and 3.5 times at liquid hourly space velocities of 4.0 and 2.0, respectively.

However, the most significant observation to be drawn from this comparison is that of naphthalene con- Table 7

| Example No. | | 17 | | 18 | |
|---|---|---|---|---|---|
| Catalyst composition Preparation | Feed | 7.30% $MoO_3$ 47.8% Zeolite Y 45.4% Clay Binder Vacuum Impregnated | | 5.2% $MoO_3$ 49.5% Zeolite Y 45.4% Clay Binder Mulled | |
| Hours on Stream | | 8–12 | 14–18 | 8–12 | 14–18 |
| Temperature, °F. | | 650 | 651 | 651 | 650 |
| LHSV | | 4.0 | 2.0 | 4.0 | 2.0 |
| Product: | | | | | |
| Gravity °API | 10.5 | 15.0 | 16.1 | 22.5 | 24.7 |
| Lt. HC's. Vol%Feed | | | | | |
| Butane | <0.01 | 0.09 | 0.11 | 0.91 | 1.21 |
| Pentanes | <0.01 | 0.13 | 0.16 | 1.42 | 1.74 |
| 120–430°F. Product | | | | | |
| Yield, Vol% Feed | — | 9.0 | 14.1 | 42.4 | 46.6 |
| Components, Vol%Feed | | | | | |
| Paraffins | 0.0 | 0.17 | 0.21 | 1.61 | 1.54 |
| Mononaphthenes | 0.0 | 0.35 | 0.44 | 3.18 | 3.77 |
| Dinaphthenes | 0.0 | 0.33 | 0.49 | 6.15 | 7.64 |
| Benzenes | 0.0 | 2.02 | 2.69 | 12.00 | 14.12 |
| Naph-Benzenes | 0.0 | 6.06 | 9.97 | 18.70 | 19.01 |
| Naphthalene | 0.0 | 0.12 | 0.28 | 0.76 | 0.47 |
| 430 + °F. Bottoms | | | | | |
| Yield,wt.% Feed | | 93.5 | 86.0 | 60.9 | 52.2 |
| Components,wt.%Feed | | | | | |
| Paraffins | 0.0 | 0.0 | 0.0 | 0.0 | 0.1 |
| Mononaphthenes | 2.0 | 0.8 | 1.5 | 0.2 | 2.4 |
| Polynaphthenes | 0.3 | 1.4 | 1.7 | 1.8 | 10.8 |
| Alkylbenzenes | 4.7 | 4.7 | 4.8 | 6.3 | 17.6 |
| Indanes+Tetralins | 7.9 | 41.1 | 44.6 | 37.9 | 19.5 |
| Dinaph.Benzenes | 2.2 | 1.9 | 1.7 | 1.6 | 0.1 |
| Naphthalenes | 80.9 | 42.5 | 30.4 | 11.2 | 1.0 |
| Biphenyls | 1.7 | 1.0 | 1.0 | 1.3 | 0.1 |
| Fluorenes | 0.3 | 0.3 | 0.3 | 0.4 | 0.6 |
| Phenanthrenes | 0.0 | 0.0 | 0.0 | 0.2 | 0.0 |

The catalyst of Example 17 contained substantially more active $MoO_3$ than did Example 18, i.e., 7.3 versus 5.2 weight percent respectively. Nevertheless, it is apparent from these results that the mulled catalyst of Example 18 was far superior in many respects to the impregnated catalyst. At 750°F. and 4.0 LHSV the yield of gasoline range hydrocarbons, i.e., 120°–430°F. product, in Example 18 was almost five times as great as that resolved in Example 17. At 2 LHSV, conversion over the mulled catalyst of Example 18 to fuel range version. Naphthalene comprised a predominant part of the feedstock accounting for 80.9 weight percent of the hydrocarbon originally present. The impregnated catalyst of Example 17 reduced the naphthalene concentration to 42.5 and 30.5 at the two respective space velocities. The predominance of this conversion was toward the production of indanes and tetralins boiling above 430°F. In contrast, the composition of Example 18 containing the active molybdenum species outside the internal pore volume of the aluminosilicate dramatically increased naphthalene conversion while transforming a much lower proportion of the naphthalene thus converted to indanes and tetralins. The principle part of the naphthalenes converted in Example 18 at both 4.0 and 2.0 LHSV were converted to fuel range hydrocarbons.

The superiority of the Example 18 catalyst is further demonstrated by comparison of its performance to that of the impregnated catalyst at 2.0 LHSV. As illustrated in Table 7, the Example 17 composition left 30.4 weight percent naphthalenes in the product corresponding to 38% of the original naphthalene content. In contrast, the Example 18 catalyst, when employed at 2.0 LHSV, left only 1 weight percent naphthalene in the product corresponding to 1.2% of the naphthalene originally present. This observation alone represents more than an order of magnitude increase in naphthalene conversion activity. It should also be observed that only a nominal portion of the naphthalenes reacted at 2.0 LHSV in Example 18 were converted to undesirable bicyclic indanes and tetralins in contrast to the relatively high production of these constituents with the catalyst of Example 17. At both space velocities in Example 18 the predominance of the naphthalenes reacted were converted to fuel range hydrocarbons boiling between 120° and 430°F. containing substantial proportions of substituted and unsubstituted benzenes.

Yet another observation deriving from this comparison bearing on the similarities in composition and reaction mechanisms promoted by these compositions is the ability of the Example 18 (mulled) catalyst to hydrogenate the unsubstituted aromatic ring of substituted naphthalene molecules. This characteristic of the new compositions enables them to effect partial hydrogenation of heavy aromatic nuclei without simultaneous conversion to gasoline, particularly at low liquid hourly space velocities, if such mechanisms are preferred. For example, at 2.0 LHSV and 650°F. the mulled catalyst produced 10.5% polynaphthenes and 12.9% alkylbenzenes, which boiled above 430°F. These benzene compounds contained 11 to 13 carbon atoms per molecule. This result contrasted sharply with the performance of the impregnated catalyst which produced relatively minor amounts of polynaphthenes and was not active for forming the heavy alkylbenzenes observed in Example 18. The most obvious explanation for this phenomenon is that the impregnated catalyst selectively hydrogenated the methyl substituted naphthalene ring or that it did not possess sufficient activity to hydrogenate the unsubstituted naphthalene ring.

It is generally well recognized that hydrogenation of substituted aromatic nuclei is much more easily accomplished than is the hydrogenation of unsubstituted aromatics. In view of the inability of the impregnated catalyst to directly hydrogenate a substantial proportion of the unsubstituted aromatic nuclei it is apparent that subsequent cracking would form lower molecular weight benzene derivatives than would be obtained with the catalyst of this invention. Initially hydrogenating and opening the unsubstituted ring formed heavier alkylbenzenes which are not readily hydrogenated as discussed by Rader, C. P. and Smith, H. A., Journal of American Chemical Society 84, 1443 (1962).

Yet another result of the markedly higher aromatics hydrogenation activity of the inventive catalyst is its ability to hydrogenate and/or hydrocrack one or more rings of polynuclear aromatic compounds to a degree far in excess of that evidenced by the prior art catalyst. For example the impregnated catalyst of Example 17 favored conversion of the naphthalene feedstock to partially hydrogenated bicyclic compounds. That catalyst had a high selectivity for tetralins and indanes boiling within the gasoline range. This performance contrasted markedly with the composition of Example 18 which exhibited substantial activity for hydrogenating and partially cracking the second ring. This mechanism, characteristic of the mulled catalyst, resulted in selective production of naphthenes and benzenes at the expense of tetralins and indanes.

The superlative qualities of the Example 18 catalyst, particularly with regard to hydrogenation and hydrocracking, are readily apparent from these observations. That catalyst, prepared in accordance with the described methods, was far superior to the catalyst of Example 17 prepared by impregnation procedures which have long been proclaimed by numerous previous investigators as constituting the best available catalyst preparation techniques.

I claim:

1. A hydrocarbon conversion catalyst comprising a crystalline zeolite base selected from the class consisting of zeolites X, Y and L, and selectively deposited on the exterior crystalline surfaces thereof a hydrogenating component selected from the class consisting of molybdenum and tungsten and the oxides and sulfides thereof, said hydrogenating component or a precursor thereof having been composited with said zeolite base in a substantially completely undissolved, finely divided form in the presence of an aqueous medium.

2. A catalyst as defined in claim 1 wherein said zeolite base contains an impregnated and/or ion exchanged Group VIII metal component.

3. A catalyst as defined in claim 2 wherein said Group VIII metal component comprises nickel and/or cobalt.

4. A catalyst as defined in claim 3 wherein said zeolite base is a hydrogen form of Y zeolite.

5. A catalyst as defined in claim 3 wherein said zeolite base is a nickel- and/or cobalt-stabilized form of Y zeolite.

* * * * *